(12) United States Patent
Brooker et al.

(10) Patent No.: US 6,300,302 B1
(45) Date of Patent: Oct. 9, 2001

(54) DETERGENT PARTICLE

(75) Inventors: Alan Thomas Brooker, Newcastle-upon-Tyne; Stephen Wayne Heinzman, Seaton Sluice Whitley Bay; Barry Thomas Ingram, Whitley Bay Tyne & Wear; Gerard Marcel Baillely, Newcastle-Upon-Tyne; Francisco Ramon Figueroa, Tyne & Wear, all of (GB)

(73) Assignee: The Procter & Gamble, Cincinnati, OH (US)

( * ) Notice: Subject to any disclaimer, the term of this patent is extended or adjusted under 35 U.S.C. 154(b) by 0 days.

(21) Appl. No.: 09/402,972

(22) PCT Filed: Apr. 14, 1998

(86) PCT No.: PCT/IB98/00559

§ 371 Date: Oct. 14, 1999

§ 102(e) Date: Oct. 14, 1999

(87) PCT Pub. No.: WO98/46714

PCT Pub. Date: Oct. 22, 1998

(30) Foreign Application Priority Data

Apr. 14, 1997 (EP) .................................................. 97870048
Mar. 3, 1998 (GB) .................................................. 9804458

(51) Int. Cl.⁷ .............................. C11D 3/10; C11D 3/60; C11D 7/12; C11D 17/00; C11D 17/06
(52) U.S. Cl. ...................... 510/445; 510/224; 510/298; 510/349; 510/356; 510/446; 510/470; 510/502; 8/137
(58) Field of Search .................................... 510/224, 298, 510/349, 356, 502, 445, 446, 470; 8/137

(56) References Cited

U.S. PATENT DOCUMENTS

| 3,769,224 | * | 10/1973 | Inamorato ............................. 510/302 |
| 4,155,868 | | 5/1979 | Kaplan et al. ......................... 252/95 |
| 4,252,664 | | 2/1981 | Inamorato ............................. 252/99 |
| 4,253,842 | * | 3/1981 | Ehrlich ................................. 510/277 |
| 4,853,211 | * | 8/1989 | Kurobe et al. ......................... 424/44 |
| 5,198,144 | * | 3/1993 | Ichii et al. ............................. 510/101 |
| 5,388,754 | * | 2/1995 | Grosclaude et al. .................. 228/118 |
| 5,741,520 | * | 4/1998 | Desenna ............................... 424/466 |

FOREIGN PATENT DOCUMENTS

| 0133354 | * | 2/1985 | (EP) . |
| WO 95/20030 | | 7/1995 | (WO) .............................. C11D/3/20 |
| WO 96/02621 A1 | | 2/1996 | (WO) .............................. C11D/3/20 |
| 97/03111 | * | 1/1997 | (WO) . |

* cited by examiner

Primary Examiner—Lorna M. Douyon
(74) Attorney, Agent, or Firm—Marianne Dressman; Kim William Zerby; Steven W. Miller

(57) ABSTRACT

The present invention relates to a substantially anhydrous effervescent particle, having an average particle size of from 75 microns to 2 cm, comprising an anhydrous particle core, which comprises one or more components of an effervescence system intimately mixed with a substantially anhydrous stabilizing agent.

14 Claims, No Drawings

DETERGENT PARTICLE

TECHNICAL FIELD

This invention relates to detergent compositions and components thereof which provide good product dispensing and dissolution.

BACKGROUND TO THE INVENTION

The use of effervescence systems in pharmaceutical and detergent tablets is well known to provide effective dissolution of the ingredients of the tablets in water. More recently, effervescence systems have been incorporated in detergent powders to provide improved dissolution.

It is known that effervescence occurs when the effervescence system is in contact with water. Thus, to maximise the effervescence capacity of the system in use, contact with water or moisture should be avoided during manufacturing or storage. Various techniques have been suggested to stabilise the effervescence systems in moist conditions.

For example, in particular pharmaceutical effervescence tablets or powders can be densified by compression or coated, to minimise contact with water or moisture. However, these tablets or powders are often difficult or costly to produce and they do not always result in satisfactory effervescence in use. In particular the dissolution or dispensing of the ingredients of the tablets or powders can be reduced or retarded.

Thus, there is still a need to provide improved effervescence systems for granular or solid detergents, which are stable in moist conditions, readily and inexpensive to produce and which provide excellent dispensing or dissolution of the detergent ingredients.

The inventors now have found that when an effervescence system or component thereof is intimately mixed with specific stabilising material, a very storage stable effervescence particle is obtained, which has a controllable effervescence in use, also resulting in an improved dispensing and dissolution. It is believed that the specific stabilising material reduces the interaction of the effervescence system with moisture. In particularly, effervescence particles having an average particle size of from 75 microns to 2 cm have been found to provide an improved effervescence and storage stability.

The particle may be used in cleaning compositions or cleaning processes. The particle is particularly useful in nonaqueous liquid detergent compositions and solid detergent compositions, including detergent granules, pastilles, flakes and tablets. Thereto, the particle contains preferably one or more detergent actives, which can be (part of) the stabilising agent It has been found that the particle can control the release of these actives. Thus, depending on the exact nature of the particle, the effervescence and the dissolution of the actives can occur immediately upon contact with water, or the start of the effervescence or the dissolution of some of the actives can be delayed, which ever is required. This can result in an improved performance of the actives and an improved cleaning performance of the particle or cleaning composition.

The inventors have furthermore found that when the stabilising particle comprises specific nonionic surfactants, in particular a nonionic polyhydroxy fatty acid amides and/or a nonionic condensation products of aliphatic alcohols, the particle has in use the additional benefit that it provides a very rapid foam formation at the start of the laundry or dish washing process, which is stable during the process.

Furthermore, the inventors have found that incorporation in the effervescent particle of one or more additional cleaning actives, results in a very finely dispersion of the actives in the washing liquor, which improves the dissolution and/or the cleaning performance of these actives. In particular, the inventors have found that the incorporation of a bleaching species and in particular bleach activators, results in an improved bleaching performance and in particular a reduced risk of patchy fabric damage. It is believed that this is due to the improved dispensing and dissolving of the bleaching species or bleach activator, leading to a reduced deposition of these ingredients on the fabric and thus a reduced risk of fabric damage.

SUMMARY OF THE INVENTION

The invention provides an substantially anhydrous effervescent particle, having an average particle size of from 75 microns to 2 cm, which comprises one or more components of an effervescence system intimately mixed with a substantially anhydrous stabilising agent, as defined herein.

The particle can be used in nonaqueous liquid or preferably solid cleaning compositions, in particularly in granular or tablet form, automatic laundry or dish washing compositions.

The invention also provides a method for delivering suds or foam and/or detergent actives to a washing liquor by use of an effervescent particle of the invention, preferably containing additional detergent actives.

DETAILED DESCRIPTION OF THE INVENTION

The particle of the invention and the stabilising agent thereof are substantially anhydrous.

When used herein, 'substantially anhydrous' means that no more than 5% by weight of free moisture is present, preferably no more than 4%, even more preferably no more than 3% and most preferably no more than 2% or even 1% by weight. The free moisture content as used herein, can be determined by placing 5 grams of the 'substantially anhydrous material' in a petri dish and placing this petri dish in a convection oven at 50° C. for 2 hours, and subsequently measuring the weight loss, due to water evaporation.

When used herein, 'intimately mixing/mixed' or 'intimate mixture' means for the purpose of the invention that components of the particles are substantially homogeneously divided in the particle.

The intimate mixture of the components of the particle of the invention can be obtained by any process involving the mixing of the components, which can be part of a compression or tableting process, extrusion process and agglomeration processes. Preferably, the particle is prepared by a process whereby a melt of the stabilising agent is admixed to the components whereby simultaneously or subsequently solid particles are formed, preferably by subsequently solidifying the melt, preferably by reducing the process temperature. When more then one component is to be incorporated in the particle, the melt of the stabilising agent is preferably admixed to a premix of the components, which are premixed prior to admixed the melt, to obtain an intimate mixture of the components prior to addition of the melt.

The particle are such that 80% by weight of the particles has an particle size of more than 75 microns (more than 80% by weight of the particles on Tyler sieve mesh 200) and less than 10% by weight of the particles has a particle size of more than 2 cm; preferably 80% by weight of the particles has an particle size of more than 150 microns (80% by weight on Tyler sieve mesh 100) and less than 10% by weight of the particles has a particle size of more than 1 cm; or more preferably 80% by weight of the particles has an particle size of more than 300 microns (80% by weight on Tyler sieve mesh 48) and less than 10% by weight of the particles has a particle size of more than to 5000 microns; or even more preferably the particles have an average particle size of from 500 microns (on Tyler sieve mesh 32) to 3000 microns, more preferably from 710 microns (on Tyler mesh sieve24) to 1180 microns (through Tyler mesh sieve 14).

Preferably, the density of the particle is from 300 g/liter to 1500 g/liter, more preferably from 500 g/liter to 1200 g/liter, more preferably from 650 g/liter to 900 g/liter.

Preferably the effervescence system comprises as components, an organic acid and a carbonate source, capable of formation of carbon dioxide upon contact with water.

The particle preferably comprises the anhydrous component at a level of from 1% to 95%, more preferably from 5% to 70%, even more preferably from 10% to 60% or even 50% by weight of the particle core. The particle preferably comprises the effervescence system at a level of from 5% to 99%, more preferably from 10% to 90%, even more preferably from 15% to 50% by weight of the particle core.

The weight ratio of the anhydrous component to the effervescence system is preferably from 40:1 to 1:20, more preferably from 20:1 to 1:10, more preferably from 10:1 to 1:8, more preferably from 4:1 to 1:4.

The particle can also comprise additional ingredients, such as detergent actives, described herein, which may be present in the particle and/or sprayed onto the particle. One or more of the additional detergent actives may be admixed to the melt of the stabilising agent, prior to solidifying of the melt, or one or more of the additional detergent actives may be added to the particle of the invention after solidifying of the melt.

The particle of the invention is particularly useful in nonaqueous liquid or solid cleaning compositions. The particle may be present as a separate particle or the it can be present as a part of a component of the solid or nonaqueous liquid composition. The cleaning compositions are preferably solid laundry or dish washing compositions, preferably in the form of flakes or pastilles, more preferably in the form of granules or extrudates or tablets. Preferably, the granular compositions have a density of at least 500 g/liter, more preferably at least 700 g/liter.

The compositions can comprise of up to 100% by weight of the particles of the invention, more preferably the particles are present at least at a level of form 5%, more preferably at least at a level of from 15%, even more preferably from 30% by weight of the composition.

It can be preferred that the cleaning composition comprises several particles of the invention, which comprise different levels of stabilising agent and effervescence components and/or different additional ingredients or levels thereof. This is particularly useful because it has been found to provide controlled delivery of the effervescence or the actives to the washing process, e.g. both a more efficient and a timely delivery can be achieved. This can be particularly useful for delivery of actives which require complete or rapid or retarded dispensing, dispersion or dissolution, to provide optimum performance.

Highly preferred additional ingredients are cationic and anionic surfactants, enzymes, and bleaching compounds, including perhydrate bleaches and bleach activators, as described hereinafter.

Effervescence System

Any effervescence system known in the art can be used in the particle of the invention. A preferred effervescence system for incorporation in the particle of the invention, comprises an acid source, capable of reacting with an alkali source in the presence of water to produce a gas.

The alkali source or part thereof may be a components of the effervescence system, when comprising an acid source, being comprised in the particle of the invention, or the alkali source or part thereof may be present in the cleaning composition comprising the particle, comprising an acid source of the invention.

The acid source component may be any organic, mineral or inorganic acid, or a derivative thereof, or a mixture thereof. Preferably the acid source component comprises an organic acid.

The acid compound is preferably substantially anhydrous or non-hygroscopic and the acid is preferably water-soluble. It may be preferred that the acid source is overdried.

Suitable acids source components include citric, maleic, maleic, fumaric, aspartic, glutaric, tartaric succinic or adipic acid, monosodium phosphate, boric acid, or derivative thereof Citric acid, maleic or malic acid are especially preferred.

Most preferably, the acid source provides acidic compounds which have an average particle size in the range of from about 75 microns to 1180 microns, more preferably from 150 microns to about 710 microns, calculated by sieving a sample of the source of acidity on a series of Tyler sieves.

As discussed above, the effervescence system preferably comprises an alkali source, however, for the purpose of the invention, it should be understood that the alkali source may be part of the effervescence particle or can be part of the cleaning composition comprising the particle, or can be present in the washing liquor, whereto the particle or the cleaning composition is added.

Any alkali source which has the capacity to react with the acid source to produce a gas may be present in the particle, which may be any gas known in the art, including nitrogen ogygen and carbondioxide gas. Preferred can be perhydrate bleaches, including perborate, and silicate material. The alkali source is preferably substantially anhydrous or non-hydroscopic. It may be preferred that the alkali source is overdried.

Preferably this gas is carbon dioxide, and therefore the alkali source is a preferably a source of carbonate, which can be any source of carbonate known in the art. In a preferred embodiment, the carbonate source is a carbonate salt. Examples of preferred carbonates are the alkaline earth and alkali metal carbonates, including sodium or potassium carbonate, bicarbonate and sesqui-carbonate and any mixtures thereof with ultra-fine calcium carbonate such as are disclosed in German Patent Application No. 2,321,001 published on Nov. 15, 1973. Alkali metal percarbonate salts are also suitable sources of carbonate species, which may be present combined with one or more other carbonate sources.

The carbonate and bicarbonate preferably have an amorphous structure. The carbonate and/or bicarbonates may be coated with coating materials. It can be preferred that the particles of carbonate and bicarbonate can have a mean particle size of 75 microns or preferably 150 $\mu$m or greater, more preferably of 250 $\mu$m or greater, preferably 500 $\mu$m or greater. It may be preferred that the carbonate salt is such that fewer than 20% (by weight) of the particles have a particle size below 500 $\mu$m, calculated by sieving a sample of the carbonate or bicarbonate on a series of Tyler sieves.

Alternatively or in addition to the previous carbonate salt, it may be preferred that the fewer than 60% or even 25% of the particles have a particle size below 150 μm, whilst fewer than 5% has a particle size of more than 1.18 mm, more preferably fewer than 20% have a particle size of more than 212 μm, calculated by sieving a sample of the carbonate or bicarbonate on a series of Tyler sieves.

The molecular ratio of the acid source to the alkali source present in the particle core is preferably from 50:1 to 1:50, more preferably from 20:1 to 1:20 more preferably from 10:1 to 1:10, more preferably from 5:1 to 1:3, more preferably from 3:1 to 1:2, more preferably from 2:1 to 1:2.

Stabilising Agent

The particle of the invention comprises a substantially anhydrous stabilising agent, as defined above. The stabilising agent can comprise one or more components. It can be preferred that the stabilising agent comprises compounds which are, at least partially, water-soluble.

Preferably, the stabilising agent is solid under normal storage conditions, e.g. the component preferably has a melting point above 30° C., more preferably above 45° C., or even more preferably above 50° C. and it may be preferred that the stabilising agent is such that it readily forms a melt above 80° C.

Preferably, the stabilising agent comprises one or more components, selected from the group comprising alkoxylated alcohols, including polyethylene and/or propylene glycols, and alkoxylated alcoholamines, including ethanolamides, alkoxylated ethanol amides, alkoxylated fatty acid amides or ethanolamides and specific nonionic surfactants, including (polyhydroxy) fatty acid amides, alkoxylated alcohol surfactants and specific alkylpolysaccherides surfactant, and mixtures of any of these compounds, as described herein.

Preferably, one or more of the components comprised in the stabilising agent are a detergent active which can contribute to the cleaning performance of the particle or the cleaning composition comprising the particle. Highly preferred substantially anhydrous components suitable in the stabilising agent of the particle of the invention, are one or more nonionic surfactant, selected from the group of nonionic alkoxylated surfactants, including alkoxylated alcohol surfactants, polyhydroxyfattyacid amide surfactants, fatty acid amide surfactants, alkoxylated fatty acid amides, alkyl esters of fatty acids and alkylpolysaccharide surfactants, and mixtures thereof, as described herein after.

In a highly preferred aspect of the invention, the stabilising agent comprises a mixture of polyhydroxy fatty acid amides and/or polyethylene glycols, and/or alkoxylated fatty acid amides and/or condensation products of aliphatic alcohols with from 1 to 15, or more preferably 11, moles of alkylene oxide, as described in more detail below. When present, the ratio of the polyhydroxy fatty acid amides to the condensation products of aliphatic alcohols is preferably from 20:1 to 1:20, more preferably from 10:1 to 1:10, more preferably from 8:1 to 1:8, more preferably from 6:1 to 1:6, most preferably from 2:1 to 1:3. When present, the ratio of the polyhydroxy fatty acid amides to the polyethylene glycol is preferably from 20:1 to 1:8, more preferably from 15:1 to 1:3, more preferably from 12:1 to 1:1, more preferably from 10:1 to 1:1. When present, the ratio of the polyhydroxy fatty acid amides to the alkoxylated fatty acid amides is preferably from 20:1 to 1:20, more preferably from 15:1 to 1:10, more preferably from 10:1 to 1:10.

Nonionic Alkoxylated Surfactant

Essentially any alkoxylated nonionic surfactants can also be comprised in the anhydrous material of the particle of the invention. The ethoxylated and propoxylated nonionic surfactants are preferred. Preferred alkoxylated surfactants can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts.

Highly preferred are nonionic alkoxylated alcohol surfactants, being the condensation products of aliphatic alcohols with from 1 to 75 moles of alkylene oxide, in particular about 50 or from 1 to 15 moles, preferably to 11 moles, particularly ethylene oxide and/or propylene oxide, are highly preferred nonionic surfactant comprised in the anhydrous component of the particles of the invention. The alkyl chain of the aliphatic alcohol can either be straight or branched, primary or secondary, and generally contains from 6 to 22 carbon atoms. Particularly preferred are the condensation products of alcohols having an alkyl group containing from 8 to 20 carbon atoms with from 2 to 9 moles and in particular 3 or 5 moles, of ethylene oxide per mole of alcohol.

Nonionic Polyhydroxy Fatty Acid Amide Surfactant

Polyhydroxy fatty acid amides are highly preferred nonionic surfactant comprised in the anhydrous material of the particles of the invention, in particular those having the structural formula $R^2CONR^1Z$ wherein: R1 is H, $C_{1-18}$, preferably $C_1$–$C_4$ hydrocarbyl, 2-hydroxy ethyl, 2-hydroxy propyl, ethoxy, propoxy, or a mixture thereof, preferable $C_1$–$C_4$ alkyl, more preferably $C_1$ or $C_2$ alkyl, most preferably $C_1$ alkyl (i.e., methyl); and $R_2$ is a $C_5$–$C_{31}$ hydrocarbyl, preferably straight-chain $C_5$–$C_{19}$ or $C_7$–$C_{19}$ alkyl or alkenyl, more preferably straight-chain $C_9$–$C_{17}$ alkyl or alkenyl, most preferably straight-chain $C_{11}$–$C_{17}$ alkyl or alkenyl, or mixture thereof, and Z is a polyhydroxyhydrocarbyl having a linear hydrocarbyl chain with at least 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl.

A highly preferred nonionic polyhydroxy fatty acid amide surfactant for use herein is a $C_{12}$–$C_{14}$, a $C_{15}$–$C_{17}$ and/or $C_{16}$–$C_{18}$ alkyl N-methyl glucamide.

It may be particularly preferred that the anhydrous component comprises a mixture of a $C_{12}$–$C_{18}$ alkyl N-methyl glucamide and a condensation products of a alcohol having an alkyl group containing from 8 to 20 carbon atoms with from 2 to 9 moles and in particular 3 or 5 moles, of ethylene oxide per mole of alcohol.

The polyhydroxy fatty acid amide can be prepared by any suitable process. One particularly preferred process is described in detail in WO 9206984. A product comprising about 95% by weight polyhydroxy fatty acid amide, low levels of undesired impurities such as fatty acid esters and cyclic amides, and which is molten typically above about 80° C., can be made by this process Nonionic Fatty Acid Amide Surfactant Fatty acid amide surfactants or alkoxylated fatty acid amides can also be comprised in the anhydrous material of the particle of the invention. They include those having the formula: $R^6CON(R^7)(R^8)$ wherein $R^6$ is an alkyl group containing from 7 to 21, preferably from 9 to 17 carbon or even 11 to 13 carbon atoms and $R^7$ and $R^8$ are each individually selected from the group consisting of hydrogen, $C_1$–$C_4$ alkyl, $C_1$–$C_4$ hydroxyalkyl, and —$(C_2H_4O)_xH$, where x is in the range of from 1 to 11, preferably 1 to 7, more preferably form 1–5, whereby it may be preferred that $R^7$ is different to $R^8$, one having x being 1 or 2, one having x being from 3 to 11 or preferably 5.

Nonionic Alkyl Esters of Fatty Acid Surfactant

Alkyl esters of fatty acids can also be comprised in the anhydrous material of the particle of the invention. They include those having the formula: $R^9COO(R^{10})$ wherein $R^9$ is an alkyl group containing from 7 to 21, preferably from 9 to 17 carbon or even 11 to 13 carbon atoms and $R^{10}$ is a $C_1$–$C_4$ alkyl, $C_1$–$C_4$ hydroxyalkyl, or —$(C_2H_4O)_xH$, where x is in the range of from 1 to 11, preferably 1 to 7, more preferably form 1–5, whereby it may be preferred that $R^{10}$ is a methyl or ethyl group.

Nonionic Alkylpolysaccharide Surfactant

Alkylpolysaccharides can also be comprised in the anhydrous material of the particle of the invention, such as those disclosed in U.S. Pat. No. 4,565,647, Llenado, issued Jan. 21, 1986, having a hydrophobic group containing from 6 to 30 carbon atoms and a polysaccharide, e.g., a polyglycoside, hydrophilic group containing from 1.3 to 10 saccharide units.

Preferred alkylpolyglycosides have the formula

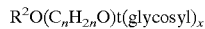

wherein $R^2$ is selected from the group consisting of alkyl, alkylphenyl, hydroxyalkyl, hydroxyalkylphenyl, and mixtures thereof in which the alkyl groups contain from 10 to 18 is carbon atoms; n is 2 or 3; t is from 0 to 10, and x is from 1.3 to 8. The glycosyl is preferably derived from glucose.

Polyethylene/Propylene Glycols

A component of the anhydrous material may be a polyethylene and/or propylene glycol, particularly those of molecular weight 1000–10000, more particularly 2000 to 8000 and most preferably about 4000.

Cleaning Compositions

The particle of the invention can comprise any additional detersive actives or ingredients known in the art and the particle can be included in a cleaning compositions, which can comprise any additional detersive actives or ingredients known in the art. The precise nature of these additional components, and levels of incorporation thereof will depend on the physical form of the composition, and the precise nature of the washing operation for which it is to be used.

The particles or the compositions preferably contain one or more additional detergent components selected from surfactants, bleaches, builders, chelants, (additional) alkalinity sources, organic polymeric compounds, enzymes, brighteners, suds suppressors, lime soap dispersants, soil suspension and anti-redeposition agents and corrosion inhibitors.

In particular, it can be preferred that the particles comprises at least one or more anionic surfactants and preferably one or more cationic surfactants, as described herein. It can also be preferred that the particles also, or alternatively comprise builder material and bleaching species, as described herein

Additional Surfactant

The particle of the invention or the compositions containing the particle of the invention, can contain one or more surfactants selected from anionic, cationic, ampholytic, amphoteric and zwitterionic surfactants or nonionic surfactants as described above, and mixtures thereof.

A typical listing of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). A list of suitable cationic surfactants is given in U.S. Pat. No. 4,259,217 issued to Murphy on Mar. 31, 1981.

Anionic Surfactant

The particle of the invention or the compositions containing the particle of the invention preferably comprises one or more anionic surfactants. Any anionic surfactant useful for detersive purposes is suitable. Examples include salts (including, for example, sodium, potassium, ammonium, and substituted ammonium salts such as mono-, di- and triethanolamine salts) of the anionic sulfate, sulfonate, carboxylate and sarcosinate surfactants. Anionic sulfate surfactants are preferred.

Other anionic surfactants include the isethionates such as the acyl isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates. Resin acids and hydrogenated resin acids are also suitable, such as rosin, hydrogenated rosin, and resin acids and hydrogenated resin acids present in or derived from tallow oil.

The anionic surfactant can be present at a level of 0.5% to 80%, preferably at a level of from 3% to 60%, more preferably of from 5% to 35% by weight of the composition or the particle. The ratio of the stabilising agent to the anionic surfactant is preferably from 1:20 to 20:1, more preferably from 1:6 to 6:1.

Anionic Sulfate Surfactant

Anionic sulfate surfactants suitable for use herein include the linear and branched primary and secondary alkyl sulfates, alkyl ethoxysulfates, fatty oleoyl glycerol sulfates, alkyl phenol ethylene oxide ether sulfates, the $C_{5-17}$ acyl— N—$(C_1$–$C_4$ alkyl) and —N—$(C_1$–$C_2$ hydroxyalkyl) glucamine sulfates, and sulfates of alkylpolysaccharides such as the sulfates of alkylpolyglucoside (the nonionic nonsulfated compounds being described herein).

Alkyl sulfate surfactants are preferably selected from the linear and branched primary $C_9$–$C_{22}$ alkyl sulfates, more preferably the $C_{11}$–$C_{15}$ branched chain alkyl sulfates and the $C_{12}$–$C_{14}$ linear chain alkyl sulfates.

Alkyl ethoxysulfate surfactants are preferably selected from the group consisting of the $C_{10}$–$C_{18}$ alkyl sulfates which have been ethoxylated with from 0.5 to 50 moles of ethylene oxide per molecule. More preferably, the alkyl ethoxysulfate surfactant is a $C_{11}$–$C_{18}$, most preferably $C_{11}$–$C_{15}$ alkyl sulfate which has been ethoxylated with from 0.5 to 7, preferably from 1 to 5, moles of ethylene oxide per molecule.

A particularly preferred aspect of the invention employs mixtures of the preferred alkyl sulfate and alkyl ethoxysulfate surfactants. Such mixtures have been disclosed in PCT Patent Application No. WO 93/18124.

Anionic Sulfonate Surfactant

Anionic sulfonate surfactants suitable for use herein include the salts of $C_5$–$C_{20}$ linear or branched alkylbenzene sulfonates, alkyl ester sulfonates, in particular methyl ester sulfonates, $C_6$–$C_{22}$ primary or secondary alkane sulfonates, $C_6$–$C_{24}$ olefin sulfonates, sulfonated polycarboxylic acids, alkyl glycerol sulfonates, fatty acyl glycerol sulfonates, fatty oleyl glycerol sulfonates, and any mixtures thereof.

Anionic Carboxylate Surfactant

Suitable anionic carboxylate surfactants include the alkyl ethoxy carboxylates, the alkyl polyethoxy polycarboxylate surfactants and the soaps ('alkyl carboxyls'), especially certain secondary soaps as described herein.

Suitable alkyl ethoxy carboxylates include those with the formula $RO(CH_2CH_2O)_x CH_2COO^-M^+$ wherein R is a $C_6$ to $C_{18}$ alkyl group, x ranges from 0 to 10, and the ethoxylate distribution is such that, on a weight basis, the amount of material where x is 0 is less than 20% and M is a cation. Suitable alkyl polyethoxy polycarboxylate surfactants include those having the formula RO—(CHR$_1$—CHR$_2$—O)X—R$_3$ wherein R is a C$_6$ to C$_{18}$ alkyl group, x is from 1 to 25, R$_1$ and R$_2$ are selected from the group consisting of hydrogen, methyl acid radical, succinic acid radical, hydroxysuccinic acid radical, and mixtures thereof, and R$_3$ is selected from the group consisting of hydrogen, substituted or unsubstituted hydrocarbon having between 1 and 8 carbon atoms, and mixtures thereof.

Suitable soap surfactants include the secondary soap surfactants which contain a carboxyl unit connected to a secondary carbon. Preferred secondary soap surfactants for use herein are water-soluble members selected from the group consisting of the water-soluble salts of 2-methyl-1-undecanoic acid, 2-ethyl-1-decanoic acid, 2-propyl-1-nonanoic acid, 2-butyl-1-octanoic acid and 2-pentyl-1-heptanoic acid. Certain soaps may also be included as suds suppressors.

Alkali Metal Sarcosinate Surfactant

Other suitable anionic surfactants are the alkali metal sarcosinates of formula R—CON (R$^1$) CH$_2$COOM, wherein R is a C$_5$–C$_{17}$ linear or branched alkyl or alkenyl group, R$^1$ is a C$_1$–C$_4$ alkyl group and M is an alkali metal ion. Preferred examples are the myristyl and oleoyl methyl sarcosinates in the form of their sodium salts.

Cationic Surfactant

Another preferred component of the particle of the invention or the compositions containing the particle of the invention, is a cationic surfactant, which may preferably be present at a level of from 0.1% to 60% by weight of the composition or particle, more preferably from 0.4% to 20%, most preferably from 0.5% to 5% by weight of the composition.

When present, the ratio of the anionic surfactant to the cationic surfactant is preferably from 25:1 to 1:3, more preferably from 15:1 to 1:1. most preferably from 10:1 to 1:1 The ratio of cationic surfactant to the stabilising agent is preferably from 1:30 to 20:1, more preferably from 1:20 to 10:1.

Preferably the cationic surfactant is selected from the group consisting of cationic ester surfactants, cationic mono-alkoxylated amine surfactants, cationic bis-alkoxylated amine surfactants and mixtures thereof.

Cationic Mono-Alkoxylated Amine Surfactants

The optional cationic mono-alkoxylated amine surfactant for use herein, has the general formula:

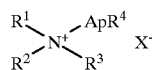

wherein R$^1$ is an alkyl or alkenyl moiety containing from about 6 to about 18 carbon atoms, preferably 6 to about 16 carbon atoms, most preferably from about 6 to about 11 carbon atoms; R$^2$ and R$^3$ are each independently alkyl groups containing from one to about three carbon atoms, preferably methyl; R$^4$ is selected from hydrogen (preferred), methyl and ethyl, X$^-$ is an anion such as chloride, bromide, methylsulfate, sulfate, or the like, to provide electrical neutrality; A is selected from C$_1$–C$_4$ alkoxy, especially ethoxy (i.e., —CH$_2$CH$_2$O—), propoxy, butoxy and mixtures thereof, and p is from 1 to about 30, preferably 1 to about 15, most preferably 1 to about 8.

Highly preferred cationic mono-alkoxylated amine surfactants for use herein are of the formula

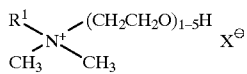

wherein R$^1$ is C$_6$–C$_{18}$ hydrocarbyl and mixtures thereof, preferably C$_6$–C$_{14}$, especially C$_6$–C$_{11}$ alkyl, preferably C$_8$ and C$_{10}$ alkyl, and X is any convenient anion to provide charge balance, preferably chloride or bromide.

As noted, compounds of the foregoing type include those wherein the ethoxy (CH$_2$CH$_2$O) units (EO) are replaced by butoxy, isopropoxy [CH(CH$_3$)CH$_2$O] and [(CH$_2$CH(CH$_3$)] units (i-Pr) or n-propoxy units (Pr), or mixtures of EO and/or Pr and/or i-Pr units.

Cationic Bis-Alkoxylated Amine Surfactant

The cationic bis-alkoxylated amine surfactant for use herein, has the general formula:

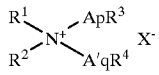

wherein R$^1$ is an alkyl or alkenyl moiety containing from about 6 to about 18 carbon atoms, preferably 6 to about 16 carbon atoms, more preferably 6 to about 11, most preferably from about 8 to about 10 carbon atoms; R$^2$ is an alkyl group containing from one to three carbon atoms, preferably methyl; R$^3$ and R$^4$ can vary independently and are selected from hydrogen (preferred), methyl and ethyl, X$^-$ is an anion such as chloride, bromide, methylsulfate, sulfate, or the like, sufficient to provide electrical neutrality. A and A' can vary independently and are each selected from C$_1$–C$_4$ alkoxy, especially ethoxy, (i.e., —CH$_2$CH$_2$O—), propoxy, butoxy and mixtures thereof; p is from 1 to about 30, preferably 1 to about 4 and q is from 1 to about 30, preferably 1 to about 4, and most preferably both p and q are 1.

Highly preferred cationic bis-alkoxylated amine surfactants for use herein are of the formula

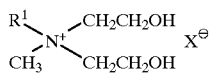

wherein R$^1$ is C$_6$–C$_{18}$ hydrocarbyl and mixtures thereof, preferably C$_6$, C$_8$, C$_{10}$, C$_{12}$, C$_{14}$ alkyl and mixtures thereof. X is any convenient anion to provide charge balance, preferably chloride. With reference to the general cationic bis-alkoxylated amine structure noted above, since in a preferred compound R$^1$ is derived from (coconut) C$_{12}$–C$_{14}$ alkyl fraction fatty acids, R$^2$ is methyl and ApR$^3$ and A'qR$^4$ are each monoethoxy.

Other cationic bis-alkoxylated amine surfactants useful herein include compounds of the formula:

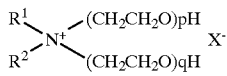

wherein R$^1$ is C$_6$–C$_{18}$ hydrocarbyl, preferably C$_6$–C$_{14}$ alkyl, independently p is 1 to about 3 and q is 1 to about 3, R$^2$ is C$_1$–C$_3$ alkyl, preferably methyl, and X is an anion, especially chloride or bromide.

Other compounds of the foregoing type include those wherein the ethoxy (CH$_2$CH$_2$O) units (EO) are replaced by butoxy (Bu) isopropoxy [CH(CH$_3$)CH$_2$O] and [CH$_2$CH (CH₃O) units (i-Pr) or n-propoxy units (Pr), or mixtures of EO and/or Pr and/or i-Pr units.

Amphoteric Surfactant

Suitable amphoteric surfactants for use herein include the amine oxide surfactants and the alkyl amphocarboxylic acids.

Suitable amine oxides include those compounds having the formula $R^3(OR^4)_xN^O(R^5)_2$ wherein $R^3$ is selected from an alkyl, hydroxyalkyl, acylamidopropoyl and alkyl phenyl group, or mixtures thereof, containing from 8 to 26 carbon atoms; $R^4$ is an alkylene or hydroxyalkylene group containing from 2 to 3 carbon atoms, or mixtures thereof; x is from 0 to 5, preferably from 0 to 3; and each $R^5$ is an alkyl or hydroxyalkyl group containing from 1 to 3, or a polyethylene oxide group containing from 1 to 3 ethylene oxide groups. Preferred are $C_{10}$–$C_{18}$ alkyl dimethylamine oxide, and $C_{10-18}$ acylamido alkyl dimethylamine oxide.

A suitable example of an alkyl aphodicarboxylic acid is Miranol(TM) C2M Conc. manufactured by Miranol, Inc., Dayton, N.J.

Zwitterionic Surfactant

Zwitterionic surfactants can also be incorporated into the particle of the invention or the compositions containing the particle of the invention. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Suitable betaines are those compounds having the formula $R(R')_2N^+R^2COO^-$ wherein R is a $C_6$–$C_{18}$ hydrocarbyl group, each $R^1$ is typically $C_1$–$C_3$ alkyl, and $R^2$ is a $C_1$–$C_5$ hydrocarbyl group. Preferred betaines are $C_{12-18}$ dimethyl-ammonio hexanoate and the $C_{10-18}$ acylamidopropane (or ethane) dimethyl (or diethyl) betaines. Complex betaine surfactants are also suitable for use herein.

Water-Soluble Builder Compound

The particle of the invention or the compositions preferably contain a water-soluble builder compound, typically present at a level of from 1% to 80% by weight, preferably from 10% to 70% by weight, most preferably from 20% to 60% by weight of the composition or particle.

Suitable water-soluble builder compounds include the water soluble monomeric polycarboxylates, or their acid forms, homo or copolymeric polycarboxylic acids or their salts in which the polycarboxylic acid comprises at least two carboxylic radicals separated from each other by not more that two carbon atoms, borates, phosphates, and mixtures of any of the foregoing.

The carboxylate or polycarboxylate builder can be monomeric or oligomeric in type although monomeric polycarboxylates are generally preferred for reasons of cost and performance.

Suitable carboxylates containing one carboxy group include the water soluble salts of lactic acid, glycolic acid and ether derivatives thereof. Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates and the sulfinyl carboxylates. Polycarboxylates containing three carboxy groups include, in particular, water-soluble citrates, aconitrates and citraconates as well as succiate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398, 421 and 1,398,422 and in U.S. Pat. No. 3,936,448, and the sulfonated pyrolysed citrates described in British Patent No. 1,439,000. Preferred polycarboxylates are hydroxycarboxylates containing up to three carboxy groups per molecule, more particularly citrates.

Borate builders, as well as builders containing borate-forming materials that can produce borate under detergent storage or wash conditions are useful water-soluble builders herein.

Suitable examples of water-soluble phosphate builders are the alkali metal tripolyphosphates, sodium, potassium and ammonium pyrophosphate, sodium and potassium and ammonium pyrophosphate, sodium and potassium orthophosphate, sodium polymeta/phosphate in which the degree of polymerization ranges from about 6 to 21, and salts of phytic acid.

Partially Soluble or Insoluble Builder Compound

The particle of the invention or the compositions containing the particle of the invention may contain a partially soluble or insoluble builder compound, typically present at a level of from 1% to 80% by weight, preferably from 10% to 70% by weight, most preferably from 20% to 60% weight of the composition or particle.

Examples of largely water insoluble builders include the sodium aluminosilicates.

Suitable aluminosilicate zeolites have the unit cell formula $Na_z[(AlO_2)_z(SiO_2)_y]\cdot xH_2O$ wherein z and y are at least 6; the molar ratio of z to y is from 1.0 to 0.5 and x is at least 5, preferably from 7.5 to 276, more preferably from 10 to 264. The aluminosilicate material are in hydrated form and are preferably crystalline, containing from 10% to 28%, more preferably from 18% to 22% water in bound form.

The aluminosilicate zeolites can be naturally occurring materials, but are preferably synthetically derived. Synthetic crystalline aluminosilicate ion exchange materials are available under the designations Zeolite A, Zeolite B, Zeolite P, Zeolite X, Zeolite HS and mixtures thereof. Zeolite A has the formula

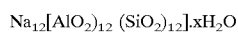

$$Na_{12}[AlO_2)_{12}(SiO_2)_{12}]\cdot xH_2O$$

wherein x is from 20 to 30, especially 27. Zeolite X has the formula $Na_{86}[(AlO_2)_{86}(SiO_2)_{106}]\cdot 276H_2O$.

Preferred crystalline layered silicates for use herein have the general formula

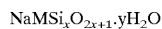

$$NaMSi_xO_{2x+1}\cdot yH_2O$$

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. Herein, x in the general formula above preferably has a value of 2, 3 or 4 and is preferably 2. The most preferred material is $\delta$-$Na_2Si_2O_5$, available from Hoechst AG as NaSKS-6.

Perhydrate Bleaches

An preferred additional components of the composition and/or particle of the invention is a perhydrate bleach, such as metal perborates, metal percarbonates, particularly the sodium salts. Perborate can be mono or tetra hydrated. Sodium percarbonate has the formula corresponding to $2Na_2CO_3 \cdot 3H_2O_2$, and is available commercially as a crystalline solid.

Potassium peroxymonopersulfate, sodium per is another optional inorganic perhydrate salt of use in the detergent compositions herein.

Organic Peroxyacid Bleaching System

A preferred feature of the particle of the invention or the compositions containing the particle of the invention, is an organic peroxyacid bleaching system. In one preferred execution the bleaching system contains a hydrogen peroxide source and an organic peroxyacid bleach precursor compound. The production of the organic peroxyacid occurs by an in situ reaction of the precursor with a source of hydrogen peroxide. Preferred sources of hydrogen peroxide include inorganic perhydrate bleaches, such as the perborate bleach of the claimed invention. In an alternative preferred execution a preformed organic peroxyacid is incorporated directly into the composition. Compositions containing mixtures of a hydrogen peroxide source and organic peroxyacid precursor in combination with a preformed organic peroxyacid are also envisaged.

Peroxyacid Bleach Precursor

Peroxyacid bleach precursors are compounds which react with hydrogen peroxide in a perhydrolysis reaction to produce a peroxyacid. Generally peroxyacid bleach precursors may be represented as

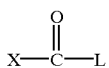

where L is a leaving group and X is essentially any functionality, such that on perhydroloysis the structure of the peroxyacid produced is

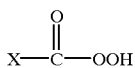

Peroxyacid bleach precursor compounds are preferably incorporated at a level of from 0.5% to 80% by weight of the particle, more preferably from 5% to 45% by weight, most preferably from 3% to 15% by weight of the compositions.

Suitable peroxyacid bleach precursor compounds typically contain one or more N- or O-acyl groups, which precursors can be selected from a wide range of classes. Suitable classes include anhydrides, esters, imides, lactams and acylated derivatives of imidazoles and oximes. Examples of useful materials within these classes are disclosed in GB-A-1586789. Suitable esters are disclosed in GB-A-836988, 864798, 1147871, 2143231 and EP-A-0170386.

Leaving Groups

The leaving group, hereinafter L group, must be sufficiently reactive for the perhydrolysis reaction to occur within the optimum time frame (e.g., a wash cycle). However, if L is too reactive, this activator will be difficult to stabilize for use in a bleaching composition.

Preferred L groups are selected from the group consisting of:

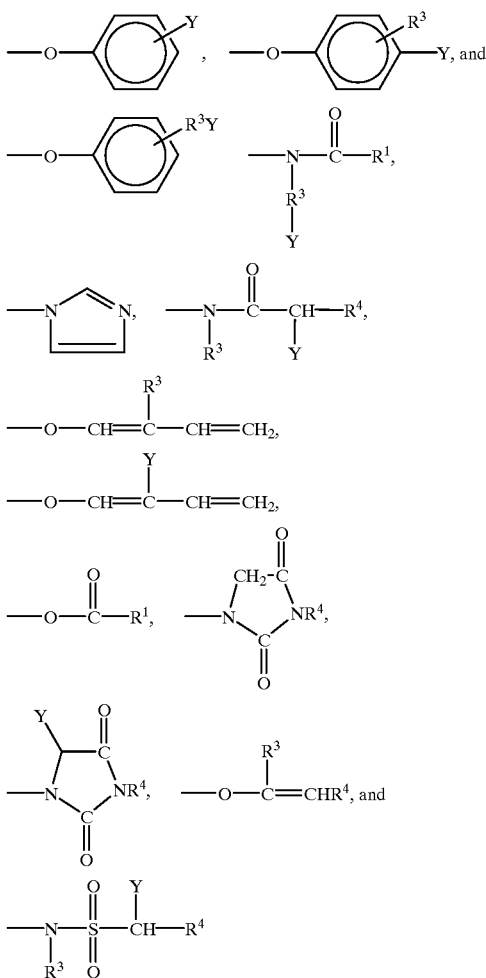

and mixtures thereof, wherein $R^1$ is an alkyl, aryl, or alkaryl group containing from 1 to 14 carbon atoms, $R^3$ is an alkyl chain containing from 1 to 8 carbon atoms, $R^4$ is H or $R^3$, and Y is H or a solubilizing group. Any of $R^1$, $R^3$ and $R^4$ may be substituted by essentially any functional group including, for example alkyl, hydroxy, alkoxy, halogen, amine, nitrosyl, amide and ammonium or alkyl ammonium groups.

The preferred solubilizing groups are $-SO_3^-M^+$, $-CO_2^-M^+$, $-SO_4^-M^+$, $-N^+(R^3)_4X^-$ and $O \leftarrow -N(R^3)_3$ and most preferably $-SO_3^-M^+$ and $-CO_2^-M^+$ wherein $R^3$ is an alkyl chain containing from 1 to 4 carbon atoms, M is a cation which provides solubility to the bleach activator and X is an anion which provides solubility to the bleach activator. Preferably, M is an alkali metal, ammonium or substituted ammonium cation, with sodium and potassium being most preferred, and X is a halide, hydroxide, methylsulfate or acetate anion.

Alkyl Percarboxylic Acid Bleach Precursors

Alkyl percarboxylic acid bleach precursors form percarboxylic acids on perhydrolysis. Preferred precursors of this type provide peracetic acid on perhydrolysis.

Preferred alkyl percarboxylic precursor compounds of the imide type include the N,N,N$^1$N$^1$ tetra acetylated alkylene diamines wherein the alkylene group contains from 1 to 6 carbon atoms, particularly those compounds in which the alkylene group contains 1, 2 and 6 carbon atoms. Tetraacetyl ethylene diamine (TAED) is particularly preferred. The TAED is preferably not present in the agglomerated particle of the present invention, but preferably present in the detergent composition, comprising the particle.

Other preferred alkyl percarboxylic acid precursors include sodium 3,5,5-tri-methyl hexanoyloxybenzene sulfonate (iso-NOBS), sodium nonanoyloxybenzene sulfonate (NOBS), sodium acetoxybenzene sulfonate (ABS) and pentaacetyl glucose.

Amide Substituted Alkyl Peroxyacid Precursors

Amide substituted alkyl peroxyacid precursor compounds are suitable herein, including those of the following general formulae:

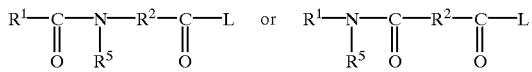

wherein $R^1$ is an alkyl group with from 1 to 14 carbon atoms, $R^2$ is an alkylene group containing from 1 to 14 carbon atoms, and $R^5$ is H or an alkyl group containing 1 to 10 carbon atoms and L can be essentially any leaving group. Amide substituted bleach activator compounds of this type are described in EP-A-0170386.

Perbenzoic Acid Precursor

Perbenzoic acid precursor compounds provide perbenzoic acid on perhydrolysis. Suitable O-acylated perbenzoic acid precursor compounds include the substituted and unsubstituted benzoyl oxybenzene sulfonates, and the benzoylation products of sorbitol, glucose, and all saccharides with benzoylating agents, and those of the imide type including N-benzoyl succinimide, tetrabenzoyl ethylene diamine and the N-benzoyl substituted ureas. Suitable imidazole type perbenzoic acid precursors include N-benzoyl imidazole and N-benzoyl benzimidazole. Other useful N-acyl group-containing perbenzoic acid precursors include N-benzoyl pyrrolidone, dibenzoyl taurine and benzoyl pyroglutamic acid.

Cationic Peroxyacid Precursors

Cationic peroxyacid precursor compounds produce cationic peroxyacids on perhydrolysis.

Typically, cationic peroxyacid precursors are formed by substituting the peroxyacid part of a suitable peroxyacid precursor compound with a positively charged functional group, such as an ammonium or alkyl ammonium group, preferably an ethyl or methyl ammonium group. Cationic peroxyacid precursors are typically present in the solid detergent compositions as a salt with a suitable anion, such as a halide ion.

The peroxyacid precursor compound to be so cationically substituted may be a perbenzoic acid, or substituted derivative thereof, precursor compound as described hereinbefore. Alternatively, the peroxyacid precursor compound may be an alkyl percarboxylic acid precursor compound or an amide substituted alkyl peroxyacid precursor as described hereinafter.

Cationic peroxyacid precursors are described in U.S. Pat. Nos. 4,904,406; 4,751,015; 4,988,451; 4,397,757; 5,269,962; 5,127,852; 5,093,022; 5,106,528; U.K. 1,382,594; EP 475,512, 458,396 and 284,292; and in JP 87-318,332.

Examples of preferred cationic peroxyacid precursors are described in UK Patent Application No. 9407944.9 and U.S. patent application Ser. Nos. 08/298,903, 08/298,650, 08/298,904 and 08/298,906.

Suitable cationic peroxyacid precursors include any of the ammonium or alkyl ammonium substituted alkyl or benzoyl oxybenzene sulfonates, N-acylated caprolactams, and monobenzoyltetraacetyl glucose benzoyl peroxides. Preferred cationic peroxyacid precursors of the N-acylated caprolactam class include the trialkyl ammonium methylene benzoyl caprolactams and the trialkyl ammonium methylene alkyl caprolactams.

Benzoxazin Organic Peroxyacid Precursors

Also suitable are precursor compounds of the benzoxazin-type, as disclosed for example in EP-A-332,294 and EP-A-482,807, particularly those having the formula:

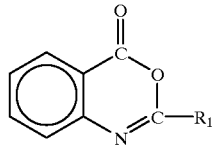

wherein $R_1$ is H, alkyl, alkaryl, aryl, or arylalkyl.

Preformed Organic Peroxyacid

The organic peroxyacid bleaching system may contain, in addition to, or as an alternative to, an organic peroxyacid bleach precursor compound, a preformed organic peroxyacid, typically at a level of from 1% to 15% by weight, more preferably from 1% to 10% by weight of the composition.

A preferred class of organic peroxyacid compounds are the amide substituted compounds of the following general formulae:

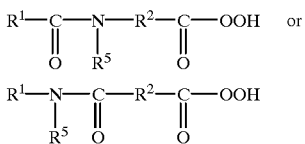

wherein $R^1$ is an alkyl, aryl or alkaryl group with from 1 to 14 carbon atoms, $R^2$ is an alkylene, arylene, and alkarylene group containing from 1 to 14 carbon atoms, and $R^5$ is H or an alkyl, aryl, or alkaryl group containing 1 to 10 carbon atoms. Amide substituted organic peroxyacid compounds of this type are described in EP-A-01 70386.

Other organic peroxyacids include diacyl and tetraacylperoxides, especially diperoxydodecanedioc acid, diperoxytetradecanedioc acid and diperoxyhexadecanedioc acid. Mono- and diperazelaic acid, mono- and diperbrassylic acid and N-phthaloylaminoperoxicaproic acid are also suitable herein.

Bleach Catalyst

The feature of the particle of the invention or the compositions containing the particle of the invention optionally contain a transition metal containing bleach catalyst. One suitable type of bleach catalyst is a catalyst system comprising a heavy metal cation of defined bleach catalytic activity, such as copper, iron or manganese cations, an auxiliary metal cation having little or no bleach catalytic activity, such as zinc or aluminum cations, and a sequestrant having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

Other types of bleach catalysts include the manganese-based complexes disclosed in U.S. Pat. No. 5,246,621 and U.S. Pat No. 5,244,594. Preferred examples of these catalysts include $Mn^{IV}_2(u\text{-}O)_3(1,4,7\text{-trimethyl-}1,4,7\text{-triazacyclononane})_2\text{---}(PF_6)_2$, $Mn^{III}_2(u\text{-}O)_1(u\text{-}OAc)_2(1,4,7\text{-trimethyl-}1,4,7\text{-triazacyclononane})_2\text{---}(ClO_4)_2$, $Mn^{IV}_4(u\text{-}O)_6(1,4,7\text{-triazacyclononane})_4\text{---}(ClO_4)$, $Mn^{III}Mn^{IV}_4(u\text{-}O)_1$ (u-OAc)$_2$-(1,4,7-trimethyl-1,4,7-triazacyclononane)$_2$—(ClO$_4$)$_3$, and mixtures thereof. Others are described in European patent application publication no. 549,272. Other ligands suitable for use herein include 1,5,9-trimethyl-1,5,9-triazacyclododecane, 2-methyl-1,4,7-triazacyclononane, 2-methyl-1,4,7-triazacyclononane, 1,2,4,7-tetramethyl-1,4,7-triazacyclononane, and mixtures thereof.

For examples of suitable bleach catalysts see U.S. Pat. Nos. 4,246,612 and 5,227,084. See also U.S. Pat. No. 5,194,416 which teaches mononuclear manganese (IV) complexes such as Mn(1,4,7-trimethyl-1,4,7-triazacyclononane)(OCH$_3$)$_3$—(PF6). Still another type of bleach catalyst, as disclosed in U.S. Pat. No. 5,114,606, is a water-soluble complex of manganese (III), and/or (IV) with a ligand which is a non-carboxylate polyhydroxy compound having at least three consecutive C—OH groups. Other examples include binuclear Mn complexed with tetra-N-dentate and bi-N-dentate ligands, including N$_4$Mn$^{III}$(u-O)$_2$Mn$^{IV}$N$_4$)$^+$ and [Bipy$_2$Mn$^{III}$(u-O) $_2$Mn$^{IV}$bipy$_2$]—(ClO$_4$)$_3$.

Further suitable bleach catalysts are described, for example, in European patent application No. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Heavy Metal Ion Sequestrant

The particle of the invention or compositions containing the particle of the invention preferably contain as an optional component a heavy metal ion sequestrant. By heavy metal ion sequestrant it is meant herein components which act to sequester (chelate) heavy metal ions. These components may also have calcium and magnesium chelation capacity, but preferentially they show selectivity to binding heavy metal ions such as iron, manganese and copper.

Heavy metal ion sequestrants are generally present at a level of from 0.005% to 20%, preferably from 0.1% to 10%, more preferably from 0.25% to 7.5% and most preferably from 0.5% to 5% by weight of the compositions or particle.

Suitable heavy metal ion sequestrants for use herein include organic phosphonates, such as the amino alkylene poly (alkylene phosphonates), alkali metal ethane 1-hydroxy disphosphonates and nitrilo trimethylene phosphonates.

Preferred among the above species are diethylene triamine penta (methylene phosphonate), ethylene diamine tri (methylene phosphonate) hexamethylene diamine tetra (methylene phosphonate) and hydroxy-ethylene 1,1 diphosphonate.

Other suitable heavy metal ion sequestrant for use herein include nitrilotriacetic acid and polyaminocarboxylic acids such as ethylenediaminotetracetic acid, ethylenetriamine pentacetic acid, ethylenediamine disuccinic acid, ethylenediamine diglutaric acid, 2-hydroxypropylenediamine disuccinic acid or any salts thereof. Especially preferred is ethylenediamine-N,N'-disuccinic acid (EDDS) or the alkali metal, alkaline earth metal, ammonium, or substituted ammonium salts thereof, or mixtures thereof.

Other suitable heavy metal ion sequestrants for use herein are iminodiacetic acid derivatives such as 2-hydroxyethyl diacetic acid or glyceryl imino diacetic acid, described in EP-A-317,542 and EP-A-399,133. The iminodiacetic acid-N-2-hydroxypropyl sulfonic acid and aspartic acid N-carboxymethyl N-2-hydroxypropyl-3-sulfonic acid sequestrants described in EP-A-516,102 are also suitable herein. The β-alanine-N,N'-diacetic acid, aspartic acid-N,N'-diacetic acid, aspartic acid-N-monoacetic acid and iminodisuccinic acid sequestrants described in EP-A-509,382 are also suitable.

EP-A476,257 describes suitable amino based sequestrants. EP-A-510,331 describes suitable sequestrants derived from collagen, keratin or casein. EP-A-528,859 describes a suitable alkyl iminodiacetic acid sequestrant. Dipicolinic acid and 2-phosphonobutane-1,2,4-tricarboxylic acid are also suitable. Glycinamide-N,N'-disuccinic acid (GADS), ethylenediamine-N-N'-diglutaric acid (EDDG) and 2-hydroxypropylenediamine-N-N'-disuccinic acid (HPDDS) are also suitable.

Enzyme

Another preferred ingredient useful in the particle of the invention or compositions containing the particle of the invention is one or more additional enzymes.

Preferred additional enzymatic materials include the commercially available lipases, cutinases, amylases, neutral and alkaline proteases, esterases, cellulases, pectinases, lactases and peroxidases conventionally incorporated into detergent compositions. Suitable enzymes are discussed in U.S. Pat. Nos. 3,519,570 and 3,533,139.

Preferred commercially available protease enzymes include those sold under the tradenames Alcalase, Savinase, Primase, Durazym, and Esperase by Novo Industries A/S (Denmark), those sold under the tradename Maxatase, Maxacal and Maxapem by Gist-Brocades, those sold by Genencor International, and those sold under the tradename Opticlean and Optimase by Solvay Enzymes. Protease enzyme may be incorporated into the compositions in accordance with the invention at a level of from 0.0001% to 4% active enzyme by weight of the composition.

Preferred amylases include, for example, α-amylases obtained from a special strain of *B licheniformis,* described in more detail in GB-1,269,839 (Novo). Preferred commercially available amylases include for example, those sold under the tradename Rapidase by Gist-Brocades, and those sold under the tradename Termamyl and BAN by Novo Industries A/S. Amylase enzyme may be incorporated into the composition in accordance with the invention at a level of from 0.0001% to 2% active enzyme by weight of the composition.

Lipolytic enzyme may be present at levels of active lipolytic enzyme of from 0.0001% to 10% by weight of the particle, preferably 0.001% to 3% by weight of the composition, most preferably from 0.001% to 0.5% by weight of the compositions.

The lipase may be fungal or bacterial in origin being obtained, for example, from a lipase producing strain of Humicola sp., Thermomyces sp. or Pseudomonas sp. including *Pseudomonas pseudoalcaligenes* or *Pseudomas fluorescens.* Lipase from chemically or genetically modified mutants of these strains are also useful herein. A preferred lipase is derived from *Pseudomonas pseudoalcaligenes* which is described in Granted European Patent, EP-B-0218272.

Another preferred lipase herein is obtained by cloning the gene from *Humicola lanuginosa* and expressing the gene in *Aspergillus oryza,* as host, as described in European Patent Application, EP-A-0258 068, which is commercially available from Novo Industri A/S, Bagsvaerd, Denmark, under the trade name Lipolase. This lipase is also described in U.S. Pat. No. 4,810,414, Huge-Jensen et al, issued Mar. 7, 1989.
Organic Polymeric Compound Organic polymeric compounds are preferred additional components of the particle of the invention or compositions containing the particle of the invention, and are preferably present as components of any particulate components where they may act such as to bind the particulate component together. By organic polymeric compound it is meant herein essentially any polymeric organic compound commonly used as dispersants, and anti-redeposition and soil suspension agents in detergent compositions, including any of the high molecular weight organic polymeric compounds described as clay flocculating agents herein.

Organic polymeric compound is typically incorporated in the detergent compositions of the invention at a level of from 0.1% to 50% by weight of the particle, preferably from 0.5% to 25%, most preferably from 1% to 15% by weight of the compositions.

Examples of organic polymeric compounds include the water soluble organic homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of MWt 2000–5000 and their copolymers with maleic anhydride, such copolymers having a molecular weight of from 20,000 to 100,000, especially 40,000 to 80,000.

The polyamino compounds are useful herein including those derived from aspartic acid such as those disclosed in EP-A-305282, EP-A-305283 and EP-A-351629.

Terpolymers containing monomer units selected from maleic acid, acrylic acid, polyaspartic acid and vinyl alcohol, particularly those having an average molecular weight of from 5,000 to 10,000, are also suitable herein.

Other organic polymeric compounds suitable for incorporation in the detergent compositions herein include cellulose derivatives such as methylcellulose, carboxymethylcellulose, hydroxypropylmethylcellulose and hydroxyethylcellulose.

Another organic compound, which is a preferred clay dispersant/anti-redeposition agent, for use herein, can be the ethoxylated cationic monoamines and diamines of the formula:

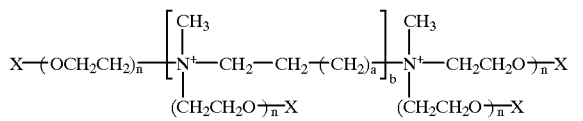

wherein X is a nonionic group selected from the group consisting of H, $C_1$–$C_4$ alkyl or hydroxyalkyl ester or ether groups, and mixtures thereof, a is from 0 to 20, preferably from 0 to 4 (e.g. ethylene, propylene, hexamethylene) b is 1 or 0; for cationic monoamines (b=0), n is at least 16, with a typical range of from 20 to 35; for cationic diamines (b=1), n is at least about 12 with a typical range of from about 12 to about 42.

Other dispersants/anti-redeposition agents for use herein are described in EP-B-011965 and U.S. Pat. Nos. 4,659,802 and 4,664,848.

Suds Suppressing System

The particle of the invention or compositions containing the particle of the invention have a very rapid formation of very stable foam. However, to improve the drainage of the suds from the machine the particle or the compositions preferably comprise a suds suppressing system present at a level of from 0.01% to 15%, preferably from 0.05% to 10%, most preferably from 0.1% to 5% by weight of the composition or the particle.

Suitable suds suppressing systems for use herein may comprise essentially any known antifoam compound, including, for example silicone antifoam compounds and 2-alkyl alcanol antifoamn compounds.

By antifoam compound it is meant herein any compound or mixtures of compounds which act such as to depress the foaming or sudsing produced by a solution of a detergent composition, particularly in the presence of agitation of that solution.

Particulary preferred antifoam compounds for use herein are silicone antifoan compounds defined herein as any antifoam compound including a silicone component. Such silicone antifoam compounds also typically contain a silica component. The term "silicone" as used herein, and in general throughout the industry, encompasses a variety of relatively high molecular weight polymers containing siloxane units and hydrocarbyl group of various types. Preferred silicone antifoam compounds are the siloxanes, particularly the polydimethylsiloxanes having trimethylsilyl end blocking units.

Other suitable antifoam compounds include the monocarboxylic fatty acids and soluble salts thereof. These materials are described in U.S. Pat. No. 2,954,347, issued Sep. 27, 1960 to Wayne St. John. The monocarboxylic fatty acids, and salts thereof, for use as suds suppressor typically have hydrocarbyl chains of 10 to 24 carbon atoms, preferably 12 to 18 carbon atoms. Suitable salts include the alkali metal salts such as sodium, potassium, and lithium salts, and ammonium and alkanolammonium salts.

Other suitable antifoam compounds include, for example, high molecular weight fatty esters (e.g. fatty acid triglycerides), fatty acid esters of monovalent alcohols, aliphatic $C_{18}$–$C_{40}$ ketones (e.g. stearone) N-alkylated amino triazines such as tri- to hexa-alkylmelamines or di- to tetra alkyldiamine chlortriazines formed as products of cyanuric chloride with two or three moles of a primary or secondary amine containing 1 to 24 carbon atoms, propylene oxide, bis stearic acid amide and monostearyl di-alkali metal (e.g. sodium, potassium, lithium) phosphates and phosphate esters.

A preferred suds suppressing system comprises
(a) antifoam compound, preferably silicone antifoam compound, most preferably a silicone antifoam compound comprising in combination
  (i) polydimethyl siloxane, at a level of from 50% to 99%, preferably 75% to 95% by weight of the silicone antifoam compound; and
  (ii) silica, at a level of from 1% to 50%, preferably 5% to 25% by weight of the antifoam compound;
wherein said silica/silicone antifoam compound is incorporated at a level of from 5% to 50%, preferably 10% to 40% by weight;
(b) a dispersant compound, most preferably comprising a silicone glycol rake copolymer with a polyoxyalkylene content of 72–78% and an ethylene oxide to propylene oxide ratio of from 1:0.9 to 1:1.1, at a level of from 0.5% to 10%, preferably 1% to 10% by weight; a particularly preferred silicone glycol rake copolymer of this type is DCO544, commercially available from DOW Corning under the tradename DCO0544;
(c) an inert carrier fluid compound, most preferably comprising a $C_{16}$–$C_{18}$ ethoxylated alcohol with a degree of ethoxylation of from 5 to 50, preferably 8 to 15, at a level of from 5% to 80%, preferably 10% to 70%, by weight;

A highly preferred particulate suds suppressing system is described in EP-A-0210731 and comprises a silicone antifoam compound and an organic carrier material having a melting point in the range 50° C. to 85° C., wherein the organic carrier material comprises a monoester of glycerol and a fatty acid having a carbon chain containing from 12 to 20 carbon atoms. EP-A-0210721 discloses other preferred particulate suds suppressing systems wherein the organic carrier material is a fatty acid or alcohol having a carbon chain containing from 12 to 20 carbon atoms, or a mixture thereof, with a melting point of from 45° C. to 80° C.

Clay Softening System

The particles or compositions may contain a clay softening system comprising a clay mineral compound and optionally a clay flocculating agent.

The clay mineral compound is preferably a smectite clay compound. Smectite clays are disclosed in the U.S. Pat. Nos. 3,862,058, 3,948,790, 3,954,632 and 4,062,647. European Patents Nos. EP-A-299,575 and EP-A-313,146 in the name of the Procter and Gamble Company describe suitable organic polymeric clay flocculating agents.

Polymeric Dye Transfer Inhibiting Agents

The particles or compositions herein may also comprise from 0.01% to 10%, preferably from 0.05% to 0.5% by weight of polymeric dye transfer inhibiting agents.

The polymeric dye transfer inhibiting agents are preferably selected from polyamine N-oxide polymers, copolymers of N-vinylpyrrolidone and N-vinylimidazole, polyvinylpyrrolidonepolymers or combinations thereof.

a) Polyamine N-oxide Polymers

Polyamine N-oxide polymers suitable for use herein contain units having the following structure formula:

$$\begin{array}{c} P \\ | \\ A_x \\ | \\ R \end{array} \quad (I)$$

wherein P is a polymerisable unit, and

A is $\overset{O}{\underset{||}{NC}}$, $\overset{O}{\underset{||}{CO}}$, C, —O—, —S—, —N—; x is 0 or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

$$(R_1)x-\overset{\overset{O}{\uparrow}}{N}-(R_2)y \quad or \quad =\overset{\overset{O}{\uparrow}}{N}-(R_1)x$$
$$\phantom{(R_1)x-}(R_3)z$$

wherein R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups. The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups. One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Other suitable polyamine N-oxides are the polyamine oxides whereto the N—O group is attached to the polymerisable unit. A preferred class of these polyamine N-oxides comprises the polyamine N-oxides having the general formula (I) wherein R is an aromatic, heterocyclic or alicyclic groups wherein the nitrogen of the N—O functional group is part of said R group. Examples of these classes are polyamine oxides wherein R is a heterocyclic compound such as pyridine, pyrrole, imidazole and derivatives thereof.

The polyamine N-oxides can be obtained in almost any degree of polymerisation. The degree of polymerisation is not critical provided the material has the desired water-solubility and dye-suspending power. Typically, the average molecular weight is within the range of 500 to 1000,000.

b) Copolymers of N-vinylpyrrolidone and N-vinylimidazole

Suitable herein are coplymers of N-vinylimidazole and N-vinylpyrrolidone having an average molecular weight range of from 5,000 to 50,000. The preferred copolymers have a molar ratio of N-vinylimidazole to N-vinylpyrrolidone from 1 to 0.2.

c) Polyvinylpyrrolidone

The particles or compositions herein may also utilize polyvinylpyrrolidone ("PVP") having an average molecular weight of from 2,500 to 400,000. Suitable polyvinylpyrrolidones are commercially available from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). PVP K-15 is also available from ISP Corporation. Other suitable polyvinylpyrrolidones which are commercially available from BASF Cooperation include Sokalan HP 165 and Sokalan HP 12.

d) Polyvinyloxazolidone

The particles or compositions herein may also utilize polyvinyloxazolidones as polymeric dye transfer inhibiting agents. Said polyvinyloxazolidones have an average molecular weight of from 2,500 to 400,000.

e) Polyvinylimidazole

The particles or compositions herein may also utilize polyvinylimidazole as polymeric dye transfer inhibiting agent. Said polyvinylimidazoles preferably have an average molecular weight of from 2,500 to 400,000.

Optical Brightener

The particles or compositions herein also optionally contain from about 0.005% to 5% by weight of certain types of hydrophilic optical brighteners.

Hydrophilic optical brighteners useful herein include those having the structural formula:

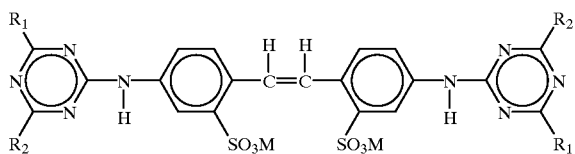

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4'-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

Cationic Fabric Softening Agents

Cationic fabric softening agents can also be incorporated into the particles of the invention or in compositions containing the particle in accordance with the present invention. Suitable cationic fabric softening agents include the water insoluble tertiary amines or dilong chain amide materials as disclosed in GB-A-1514 276 and EP-B-0 011 340.

Cationic fabric softening agents are typically incorporated at total levels of from 0.5% to 15% by weight, normally from 1% to 5% by weight.

Other Optional Ingredients

Other optional ingredients suitable for inclusion in the compositions or particles of include highly preferably perfumes, colours and filler salts, with sodium sulfate being a preferred filler salt.

pH of the Compositions

The present compositions or particles preferably can have an acidic or an alkaline pH, depending on the application or the additional ingredients. It may be preferred that the particles or the compositions have a pH, measured as a 1% solution in distilled water, of at least 3.0, preferably from 4.0 to 12.5.

Form of the Compositions

The detergent composition comprising the particles of the invention can be made via a variety of methods, including dry-mixing, extruding, compacting and agglomerating of the various compounds comprised in the detergent composition. The particles can be present in the compositions as a separate component of the composition, or can be added to other components or compounds of the compositions.

The compositions can take a variety of physical forms including granular, extrudate, tablet or bar forms. The compositions are particularly the so-called concentrated granular detergent compositions adapted to be added to a washing machine by means of a dispensing drawer or by means of a dispensing device placed in the machine drum with the soiled fabric load.

The bulk density of granular detergent compositions in accordance with the present invention typically have a bulk density of at least 500 g/liter, more preferably from 650 g/liter or even 700 g/liter to 1200, more preferably to 850 g/liter. Bulk density is measured by means of a simple funnel and cup device consisting of a conical funnel moulded rigidly on a base and provided with a flap valve at its lower extremity to allow the contents of the funnel to be emptied into an axially aligned cylindrical cup disposed below the funnel. The funnel is 130 mm high and has internal diameters of 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement eg; a knife, across its upper edge. The filled cup is then weighed and the value obtained for the weight of powder doubled to provide a bulk density in g/liter. Replicate measurements are made as required.

The composition is preferably soluble in cold or cool water, i.e. the composition readily dissolves/disperses in water at a temperature between about 0° C. and 32.2° C., preferably between about 1.6° C. and 10° C.

Laundry Washing Method

Machine laundry methods herein typically comprise treating soiled laundry with an aqueous wash solution in a washing machine having dissolved or dispensed therein an effective amount of a machine laundry particles of the invention or composition comprising the particles of the invention. By an effective amount of the detergent composition it is meant from 40 g to 300 g of product dissolved or dispersed in a wash solution of volume from 5 to 65 liters, as are typical product dosages and wash solution volumes commonly employed in conventional machine laundry methods.

Packaging for the Compositions

Commercially marketed executions of the bleaching compositions can be packaged in any suitable container including those constructed from paper, cardboard, plastic materials and any suitable laminates. A preferred packaging execution is described in European Application No. 94921505.7.

Abbreviations used in Examples

In the particles and cleaning compositions, the abbreviated component identifications have the following meanings:

| | |
|---|---|
| LAS | Sodium linear $C_{12}$ alkyl benzene sulfonate |
| TAS | Sodium tallow alkyl sulfate |
| C45AS | Sodium $C_{14}$–$C_{15}$ linear alkyl sulfate |
| MES | α-sulpho methylester of $C_{18}$ fatty acid |
| CxyEzS | Sodium $C_{1x}$–$C_{1y}$ branched alkyl sulfate condensed with z moles of ethylene oxide |
| $MBAS_{x,y}$ | Sodium mid-chain branched alkyl sulfate having an average of x carbon atoms, whereof an average of y carbons comprised in (a) branching unit(s) |
| C48SAS | Sodium $C_{14}$–$C_{18}$ secondary alcohol sulfate |
| SADExS | Sodium $C_{14}$–$C_{22}$ alkyl disulfate of formula 2-(R).$C_4H_7$-1,4-$(SO_4$-$)_2$ where R = $C_{10}OC_{18}$, condensed with z moles of ethylene oxide |

-continued

| | |
|---|---|
| CxyEz | A $C_{1x-1y}$ branched primary alcohol condensed with an average of z moles of ethylene oxide |
| QAS I | $R_2.N^+(CH_3)_2(CH_2H_4OH)$ with $R_2$ = 50%–60% $C_9$; 40%–50% $C_{11}$ |
| QAS II | $R_1.N^+(CH_3)(C_2H_4OH)_2$ with $R_1$ = $C_{12}$–$C_{14}$ |
| Soap | Sodium linear alkyl carboxylate derived from an 80/20 mixture of tallow and coconut oils. |
| TFAA I | $C_{12}$–$C_{14}$ alkyl N-methyl glucamide |
| TFAA II | $C_{16}$–$C_{18}$ alkyl N-methyl glucamide |
| TPKFA | $C_{12}$–$C_{14}$ topped whole cut fatty acids |
| STPP | Anhydrous sodium tripolyphosphate |
| Zeolite A I | Hydrated Sodium Aluminosilicate of formula $Na_{12}(AlO_2SiO_2)_{12}.27H_2O$ having a primary particle size in the range from 0.1 to 10 micrometers |
| Zeolite A II | overdried Zeolite A I |
| NaSKS-6 | Crystalline layered silicate of formula $\delta$-$Na_2Si_2O_5$ |
| Citric acid I | Anhydrous citric acid |
| Citric acid II | Citric acid monohydrate |
| Malic acid | Anhydrous malic acid |
| Maleic acid | Anhydrous maleic acid |
| Aspartic acid | Anhydrous aspartic acid |
| Carbonate I | Anhydrous sodium carbonate with an average particle size between 200 $\mu$m and 900 $\mu$m |
| Carbonate II | Anhydrous sodium carbonate with an average particle size betewen 100 $\mu$m and 200 $\mu$m |
| Bicarbonate | Anhydrous sodium bicarbonate with a particle size distribution between 400 $\mu$m and 1200 $\mu$m |
| Silicate | Amorphous Sodium Silicate ($SiO_2$:$Na_2O$; 2.0 ratio) |
| Sodium sulfate | Anhydrous sodiun sulfate |
| Citrate | Tri-sodium citrate dihydrate of activity 86.4% with a particle size distribution between 425 $\mu$m and q 850 $\mu$m |
| MA/AA | Copolymer of 1:4 maleic/acrylic acid, average molecular weight about 70,000 |
| CMC | Sodium carboxymethyl cellulose |
| Protease | Proteolytic enzyme of activity 4 KNPU/g sold by NOVO Industries A/S under the tradename Savinase |
| Alcalase | Proteolytic enzyme of activity 3 AU/g sold by NOVO Industries A/S |
| Cellulase | Cellulytic enzyme of activity 1000 CEVU/g sold by NOVO Industries A/S under the tradename Carezyme |
| Amylase | Amylolytic enzyme of activity 60 KNU/g sold by NOVO Industries A/S under the tradename Termamyl 60T |
| Lipase | Lipolytic enzyme of activity 100 kLU/g sold by NOVO Industries A/S under the tradename Lipolase |
| Endolase | Endoglunase enzyme of activity 3000 CEVU/g sold by NOVO Industries A/S |
| PB4 | Sodium perborate tetrahydrate of nominal formula $NaBO_2.3H_2O.H_2O_2$ |
| PB1 | Anhydrous sodium perborate bleach of nominal formula $NaBO_2.H_2O_2$ |
| Percarbonate | Sodium Percarbonate of nominal formula $2Na_2CO3.3H2O2$ |
| NAC-OBS | (Nonanamido caproyl) oxybenzene sulfonate in the form of the sodium salt. |
| NOBS | Nonanoyl oxybenzene sulfonate in the form of the sodium salt |
| DPDA | Diperoxydodecanedioic acid |
| PAP | N-phthaloylamidoperoxicaproic acid |
| NAPAA | Nonanoylamido peroxo-adipic acid |
| NACA | 6 nonylamino - 6 oxo - capronic acid. |
| TAED | Tetraacetylethylenediamine |

-continued

| | |
|---|---|
| DTPMP | Diethylene triamine penta (methylene phosphonate), marketed by Monsanto under the Trade name Dequest 2060 |
| Photoactivated | Sulfonated Zinc or aluminium Phthlocyanine encapsulated |
| Brightener 1 | Disodium 4,4'-bis(2-sulphostyryl)biphenyl |
| Brightener 2 | Disodium 4,4'-bis(4-anilino-6-morpholino-1.3.5-triazin-2-yl)amino) stilbene-2:2'-disulfonate. |
| HEDP | 1,1-hydroxyethane diphosphonic acid |
| PVNO | Polyvinylpyridine N-oxide |
| PVPVI | Copolymer of polyvinylpyrolidone and vinylimidazole |
| QEA | bis $((C_2H_5O)(C_2H_4O)_n)(CH_3)$ -$N^+$-$C_6H_{12}$-$N^+$-$(CH_3)$ bis $((C_2H_5O)$-$(C_2H_4O)_n)$, wherein n=from 20 to 30 |
| SRP 1 | Sulfobenzoyl end capped esters with oxyethylene oxy and terephtaloyl backbone |
| SRP 2 | Diethoxylated poly (1,2 propylene terephtalate) short block polymer |
| Silicone antifoam | Polydimethylsiloxane foam controller with siloxane-oxyalkylene copolymer as dispersing agent with a ratio of said foam controller to said dispersing agent of 10:1 to 100:1. |

In the following Examples all levels are quoted as parts per weight of the composition or % by weight of the composition, as indicated:

Particle Examples

The following examples exemplify particles in accord with the invention, each of which, or mixtures thereof, can be used in cleaning compositions or as cleaning composition.

The particles of the invention can be made by any method known in the art for formation of particles, as described above. The following particles are formed by formation of a melt of the substantially anhydrous stabilising agent, and addition of the melt to a premix of the other component to the melt, mixing the ingredients thoroughly, whereafter the melt is solidified.

Particles A to I

| | A | B | C | D | E | F | G | H | I | J |
|---|---|---|---|---|---|---|---|---|---|---|
| TFAA I/TFAAII | 32.0 | 11.0 | 12.0 | 32.0 | 15.0 | 10 | 37 | 25.0 | — | 10.0 |
| C24E3/C24E5 | — | — | 28.0 | — | 25.0 | 30.0 | — | 5.0 | 15.0 | 15.0 |
| PEG 4000 | 5.0 | 3.3 | — | 5.0 | — | — | 7.0 | 5.0 | — | 5.0 |
| citric acid I | 13.5 | 26.0 | 20.0 | 15.5 | 16.0 | 10.0 | 15.0 | 10.0 | — | 13.5 |
| malic acid | — | 10.0 | — | — | — | 10.0 | — | — | 10.5 | — |
| maleic acid | — | — | — | — | — | — | — | — | — | 13.0 |
| sodium carbonate I | 13.5 | — | 20.0 | — | — | — | — | — | 15.0 | 13.5 |

-continued

|  | A | B | C | D | E | F | G | H | I | J |
|---|---|---|---|---|---|---|---|---|---|---|
| sodium carbonate II | — | 14.0 | — | 6.0 | 14.0 | 20.0 | 10.0 | 10.0 | 5.0 | — |
| sodium bicarbonate | — | — | — | 6.0 | — | — | 10.0 | — | 5.5 | — |
| Zeolite A II | 18.0 | 35.7 | 20.0 | 18.0 | — | 9.0 | 10.0 | 5.0 | 14.0 | 17.0 |
| LAS | 9.0 | — | — | — | 10.0 | — | — | 10.0 | — | 13.0 |
| QAS I/QAS II | 9.0 | — | — | — | — | — | 6.0 | 3.0 | — | — |
| TAED/NOBS/NACA-OBS | — | — | — | 19.0 | 10.0 | — | — | 7.0 | 35.0 | — |
| Perborate/percarbonate | — | — | — | — | 10.0 | 19.0 | — | 20.0 | — | — |

The following examples exemplify cleaning compositions comprising the particle of the invention:

EXAMPLE I

The following are high density and bleach-containing detergent formulations according to the present invention:

|  | a | b | c |
|---|---|---|---|
| Blown Powder |  |  |  |
| Zeolite A | 5.0 | 5.0 | 15.0 |
| Sodium sulfate | 0.0 | 5.0 | 0.0 |
| LAS | — | 5.0 | 3.0 |
| C45AS | 3.0 | 2.0 | 4.0 |
| QAS | — | — | 1.5 |
| DTPMP | 0.4 | 0.4 | 0.4 |
| CMC | 0.4 | 0.4 | 0.4 |
| MA/AA | 4.0 | 2.0 | 2.0 |
| Particle A or J | 20.0 | — | — |
| Particle B | — | 15.0 | — |
| Particle E | — | — | 10.0 |
| Spray On (on particles) |  |  |  |
| Encapsulated Perfume | 0.3 | 0.3 | 0.3 |
| C25E3 | — | — | 2.0 |
| Dry additives |  |  |  |
| QEA | — | — | 0.5 |
| Citrate | 5.0 | — | 2.0 |
| Bicarbonate | — | 3.0 | — |
| Carbonate | 8.0 | 10.0 | 5.0 |
| NAC OBS | 6.0 | — | — |
| Manganese catalyst | — | — | 0.3 |
| NOBS | — | 2.0 | — |
| PB1 | 14.0 | 7.0 | — |
| Polyethylene oxide of MW 5,000,000 | — | — | 0.2 |
| Bentonite clay | — | — | 10.0 |
| Citric acid | — | — | 0.5 |
| Protease | 1.0 | 1.0 | 1.0 |
| Lipase | 0.4 | 0.4 | 0.4 |
| Amylase | 0.6 | 0.6 | 0.6 |
| Cellulase | 0.6 | 0.6 | 0.6 |
| Silicone antifoam | 5.0 | 5.0 | 5.0 |
| Dry additives |  |  |  |
| Sodium sulfate | 0.0 | 3.0 | 0.0 |
| Balance (Moisture and Miscellaneous) | 100.0 | 100.0 | 100.0 |
| Density (g/liter) | 850 | 850 | 850 |

EXAMPLE 2

The following are high density detergent formulations according to the present invention:

|  | d | e |
|---|---|---|
| Particle A | 15.0 | — |
| Particle H or I | — | 30.0 |
| Spray On |  |  |
| C25E3 | — | 1.0 |
| Perfume | 0.5 | 0.5 |
| Dry Adds |  |  |
| HEDP | 0.5 | 0.3 |
| SKS 6 | 13.0 | 10.0 |
| Citrate | — | 1.0 |
| NAC OBS | 4.1 | — |
| TAED | 0.8 | — |
| Percarbonate | 20.0 | 5.0 |
| SRP 1 | 0.3 | 0.3 |
| Protease | 1.4 | 1.4 |
| Lipase | 0.4 | 0.4 |
| Cellulase | 0.6 | 0.6 |
| Amylase | 0.6 | 0.6 |
| QEA | 1.0 | — |
| Silicone antifoam | 5.0 | 5.0 |
| Brightener 1 | 0.2 | 0.2 |
| Brightener 2 | 0.2 | — |
| Density (g/liter) | 850 | 850 |

EXAMPLE 3

The following granular detergent formulations are examples of the present invention.

|  | f | g | h |
|---|---|---|---|
| Blown powder |  |  |  |
| MES | — | 2.0 | — |
| LAS | 2.0 | — | — |
| C45AS | — | 1.0 | — |
| C46AS | 4.0 | — | — |
| C45AE35 | 2.0 | 5.0 | 3.0 |
| MBAS18, 4.0 | 8.0 | — | — |
| Zeolite A | 16.0 | 19.0 | 6.0 |
| MA/AA | 3.0 | — | — |
| AA | 3.0 | 2.0 | 3.0 |
| Sodium sulfate | 3.3 | 24.0 | 13.3 |
| Silicate | 1.0 | 2.0 | 1.0 |
| Carbonate | 9.0 | 25.7 | 8.0 |
| QEA | 0.4 | — | 0.5 |
| PEG 4000 | — | 1.0 | 1.5 |
| Brightener | 0.3 | 0.3 | 0.3 |
| Spray on |  |  |  |
| C25E5 | 0.5 | 1.0 | — |
| Perfume | 0.3 | 1.0 | 0.3 |
| Particle A, E or H or I | — | — | 20.0 |

-continued

|  | f | g | h |
|---|---|---|---|
| Particle D or F or I | — | 15.0 | — |
| Particle B or C | 10.0 | — | — |
| Dry additives |  |  |  |
| NACAOBS/NOBS | 3.0 | — | — |
| TAED | 1.0 | — | 2.0 |
| PB4 | 1.0 | — | 2.0 |
| Carbonate | 5.3 | — | 2.5 |
| Cumeme sulfonic acid | 2.0 | — | 2.0 |
| Lipase | 0.4 | 0.1 | 0.05 |
| Cellulase | 0.2 | — | 0.2 |
| Amylase | 0.3 | — | — |
| Protease | 1.6 | — | 1.6 |
| PvPvI | 0.5 | — | — |
| PVNO | 0.5 | — | — |
| SRP1 | 0.5 | — | — |
| Silicone antifoam | 1.0 | — | 0.2 |

What is claimed is:

1. A substantially anhydrous effervescence particle, having an average particle size of from 75 microns to 2 cm, an effervescence system comprising an acid source and an alkali source intimately mixed with a substantially anhydrous stabilizing agent selected from the group consisting of an alkylpolysaccharide, polyhydroxy fatty acid amide and an alkyl ester of a fatty acid; wherein the density of the particle is from 500 g/l to 1200 g/l.

2. A particle according to claim 1 obtainable by a process comprising the steps
   a) formation of a melt of the substantially anhydrous stabilizing agent;
   b) addition of the melt of step a) to the effervescence system to obtain a mixture; and
   c) formation of particles of the mixture of step b).

3. A particle according to claim 2 in which formation of the particles from the mixture of step b) is by solidifying of the mixture.

4. A particle according to claim 1 wherein the acid source is an organic carboxylic acid.

5. A particle according to claim 4, wherein the alkali source contains a carbonate.

6. A particle according to claim 5 whereby the ratio of the acid source to the alkali source is from 10:1 to 1:10.

7. A particle according to claim 1 whereby the substantially anhydrous stabilizing agent is present at a level of from 5% to 70% by weight of the particle and the effervescence system is present at a level of from 10% to 90% by weight of the particle.

8. A particle according claim 1 comprising additional detergent actives selected from the group consisting of anionic surfactants, cationic surfactants, builders, perhydrate bleach, bleach activators, enzymes, chelants, suds suppressing systems, brighteners, and perfumes.

9. A particle according to claim 8 comprising additional detergent actives from at least one or more anionic and/or cationic surfactants.

10. A solid detergent composition, comprising a particle according to claim 1.

11. A granular detergent comprising the solid detergent composition according to claim 10.

12. A detergent tablet comprising a particle according to claim 11.

13. A process for making of a particle according to claim 1, comprising the steps of
   a) formation of a melt of the substantially anhydrous stabilizing agent;
   b) addition of the melt of step a) to the effervescence system to obtain a mixture and formation of particles of the mixture.

14. A method for washing fabrics whereby the fabrics are contacted with the particle according to claim 1.

* * * * *